United States Patent
Burke et al.

(10) Patent No.: US 12,055,447 B2
(45) Date of Patent: Aug. 6, 2024

(54) SYSTEMS AND METHODS OF PRESSURE TESTING COILED TUBING

(71) Applicant: ConocoPhillips Company, Houston, TX (US)

(72) Inventors: Jason Burke, Houston, TX (US); John G. Eller, Houston, TX (US); Matthew L. White, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 17 days.

(21) Appl. No.: 17/867,418

(22) Filed: Jul. 18, 2022

(65) Prior Publication Data
US 2023/0019069 A1    Jan. 19, 2023

Related U.S. Application Data

(60) Provisional application No. 63/222,732, filed on Jul. 16, 2021.

(51) Int. Cl.
| | |
|---|---|
| *G01L 1/02* | (2006.01) |
| *G01M 3/02* | (2006.01) |
| *G01M 3/28* | (2006.01) |

(52) U.S. Cl.
CPC .............. *G01L 1/02* (2013.01); *G01M 3/022* (2013.01); *G01M 3/2815* (2013.01)

(58) Field of Classification Search
CPC ....... G01L 1/02; G01M 3/022; G01M 3/2815; G01M 3/2846; G01M 3/2853; G01M 3/2869

See application file for complete search history.

(56) References Cited

U.S. PATENT DOCUMENTS

| | | | | |
|---|---|---|---|---|
| 3,478,577 | A * | 11/1969 | Hauk ................... | G01M 3/2853 73/49.1 |
| 5,287,741 | A | 2/1994 | Schultz et al. | |
| 5,348,088 | A * | 9/1994 | Laflin ..................... | E21B 17/04 166/134 |
| 5,350,018 | A | 9/1994 | Sorem et al. | |
| 6,116,340 | A | 9/2000 | Wilson et al. | |
| 6,373,914 | B1 * | 4/2002 | Gill ........................ | G21C 17/00 376/245 |
| 6,935,163 | B2 | 8/2005 | Stewart et al. | |
| 6,959,763 | B2 | 11/2005 | Hook et al. | |
| 7,216,703 | B2 | 5/2007 | Smith | |
| 2004/0251022 | A1 | 12/2004 | Smith | |
| 2018/0038763 | A1 * | 2/2018 | Tuttle .................. | G01M 3/2846 |

* cited by examiner

*Primary Examiner* — Paul M. West
(74) *Attorney, Agent, or Firm* — Polsinelli PC

(57) ABSTRACT

Disclosed are systems and methods for pressure testing coiled tubing (CT) in a well. A CT pressure testing device may include a CT connector for attaching to a CT segment and a pressure test housing defining a pressure chamber. A rod may extend through a top opening of the pressure test housing and through the CT connector to the severed end of the CT segment. A sealing plug coupled to a bottom end of the rod may create an interface between the CT connector and the CT segment. A force activator may apply a force to a top end of the rod, causing the rod to push the sealing plug into the CT segment and tighten the interface. A pump may pressurize the pressure chamber to perform a pressure test on the sealing plug. Accordingly, the CT pressure testing device may establish a well control barrier for the well.

20 Claims, 4 Drawing Sheets

SYSTEMS AND METHODS OF PRESSURE TESTING COILED TUBING

CROSS-REFERENCE TO RELATED APPLICATION

The present application claims priority to U.S. Patent Application No. 63/222,732, filed on Jul. 16, 2021, which is incorporated by reference in its entirety herein.

TECHNICAL FIELD

Aspects of the present disclosure relate generally to systems and methods for pressure testing coiled tubing (CT) and creating a well control barrier with a CT pressure testing device.

BACKGROUND

Coiled tubing (CT) is long continuous metal piping deployed in oil and gas drilling operations for multiple purposes such as fluid circulation, deliquification, pumping, CT drilling, wireline recovery, and other intervention operations. CT deployment involves injecting the CT into a well at the well head and, once a CT is injected to the desired depth, severing the CT to create a CT segment in the well with a CT end accessible at the surface. Control barriers are attached to the CT end at the surface. However, sometimes the CT end at the surface must be cut after the control barriers are in place. Cutting the CT at the surface can defeat existing pressure barriers, such as a CT wall. Moreover, processes for attempting to reconnect to the CT end after cutting may not include proper pressure testing to confirm that the CT connector placed over the CT end is an adequate pressure barrier. Wells receiving CT for intervention operations may have unpredictable or inconsistent pressure during the intervention operation (e.g., wells that are failing to pump due to a plugged bottom hole assembly (BHA), or wells that cannot place kill weight fluid (KWF) due to a downhole obstructions). As such, operating with the CT connector after cutting the CT end but without proper pressure testing may not ensure adequate pressure monitoring over the well.

It is with these observations in mind, among others, that various aspects of the present disclosure were conceived and developed.

SUMMARY

Implementations described and claimed herein address the foregoing problems by providing systems and methods for maintaining well integrity during CT operations at pressurized wells. In some examples, a system for pressure testing coiled tubing (CT) comprises: a CT connector including: a first distal end; a second distal end opposite the first distal end for coupling to a severed end of a CT segment; and a channel extending from the first distal end to the second distal end; a pressure test housing for coupling to the second distal end of the CT connector, the pressure test housing including: a pressure chamber at the first distal end of the CT connector; a pressure isolation valve; and an opening at a top portion of the pressure test housing; a sealing plug positioned adjacent to the second distal end and inside the severed end of the CT segment; a rod coupled to the sealing plug and extending through the channel and the opening; and a force activator coupled to the rod outside the pressure chamber for causing the rod to push the sealing plug into the severed end of the CT segment.

In some instances, the system further comprises a high volume/low pressure pump coupled to the pressure isolation valve for increasing a pressure of the pressure chamber. The system can further comprise a pressure sensor or pressure gauge for detecting the pressure of the pressure chamber. The system can further comprise a high-pressure thread coupling the pressure test housing to the first distal end of the CT connector. The system can further comprise a slip fitting coupling the second distal end to the severed end of the CT segment. In some instances, the force activator comprises a hand wheel for causing the rod to rotate, push toward the severed end of the CT segment, and tighten the sealing plug in the severed end of the CT segment. In some examples, the force activator comprises a hydraulic pump for generating a hydraulic force on the rod and causing the rod to tighten the sealing plug in the severed end of the CT segment.

In some examples, a device for pressure testing coiled tubing (CT) comprises: a pressure test housing for coupling to a distal end of a CT connector, the pressure test housing including: a pressure chamber at the distal end of the CT connector; a fluid inlet; and an opening at a top portion of the pressure test housing; a rod extending through the opening and through the CT connector to abut a sealing plug disposed inside a severed end of a CT segment; and a force activator coupled to the rod outside the pressure chamber for causing the rod to tighten the sealing plug.

In some instances, the rod is a high strength metal rod. The rod may have a length between 12" and 24". The device can further comprise a seal, at the opening, abutting the rod for maintaining a pressure of the pressure chamber. The distal end of the CT connector can comprise a first distal end, and the sealing plug can abut a second distal end of the CT connector opposite the first distal end. In some examples, the force activator generates a hydraulic force or a rotational force to push the rod and sealing plug into the severed end. The fluid inlet can include a pressure isolation valve coupled to a high volume/low pressure pump. The high volume/low pressure pump can include a pressure gauge or pressure sensor for detecting a pressure of the pressure chamber.

Implementations described and claimed herein address the foregoing problems by providing systems and methods for pressuring testing CT and/or providing a well control barrier with the CT pressure testing device. Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

The foregoing summary, as well as the following detailed description, will be better understood when read in conjunction with the appended drawings. For the purpose of illustration, there is shown in the drawing certain embodiments of the disclosed subject matter. It should be understood, however, that the disclosed subject matter is not limited to the precise embodiments and features shown. The accompanying drawings, which are incorporated in and constitutes a part of this specification, illustrates an implementation of systems, methods, and apparatuses consistent with the disclosed subject matter and, together with the description, serves to explain advantages and principles consistent with the disclosed subject matter, in which.

DETAILED DESCRIPTION

Maintaining well integrity during CT operations at pressurized wells involves implementing sufficient independent well control barriers. Aspects of the present disclosure involve systems and methods for pressure testing a CT connector and/or creating a well control barrier with a CT pressure testing device after cutting a CT end at surface. The CT pressure testing device can be deployed at a severed end of a CT segment for testing pressure of the CT segment and providing an additional well control barrier during a CT cutting procedure.

The CT pressure testing device can include a pressure test housing that couples to a first distal end (e.g., a top portion) of a CT connector, the CT connector being attached to the severed end of the CT segment. The pressure test housing may define a pressure chamber around and/or above the top portion of the CT connector. A rod may extend through a sealed opening at the top of the pressure test housing, extend through the pressure chamber and the CT connector, and couple to a sealing plug disposed at a second end of the CT connector opposite the first end. A force activator may attach to a top end of the rod for generating a sealing force that pushes the rod and the sealing plug into the severed end of a CT segment, creating a pressurized seal at the severed end.

In some examples, a high volume/low pressure pump may couple to a fluid inlet of the pressure test housing to pressurize the pressure chamber once the rod and sealing plug are in place. A pressure of the pressure chamber can be detected or measured, for instance, by a pressure sensor or pressure gauge at the high volume/low pressure pump. Once the pressure is measured, the sealing force is relaxed and the pressure test housing may be decoupled from the CT connector.

Accordingly, the CT pressure testing device can create a well control barrier by forming a barrier between the internal pressure of the CT segment and an external area adjacent to the severed end of the CT segment (e.g., the other well control barrier or the outside air) while providing a mechanism for determining the internal pressure of the CT segment. As such, problems associated with operating under a dispensation (e.g., with only a single well control barrier) or problems associated with using CT shear rams to "slingshot" the severed end below a master valve (as is often done in the absence of a second well control barrier) may be resolved or avoided all together. The technology disclosed herein improves safety of CT operations while increasing control and monitoring capabilities of the well.

Figure 1:
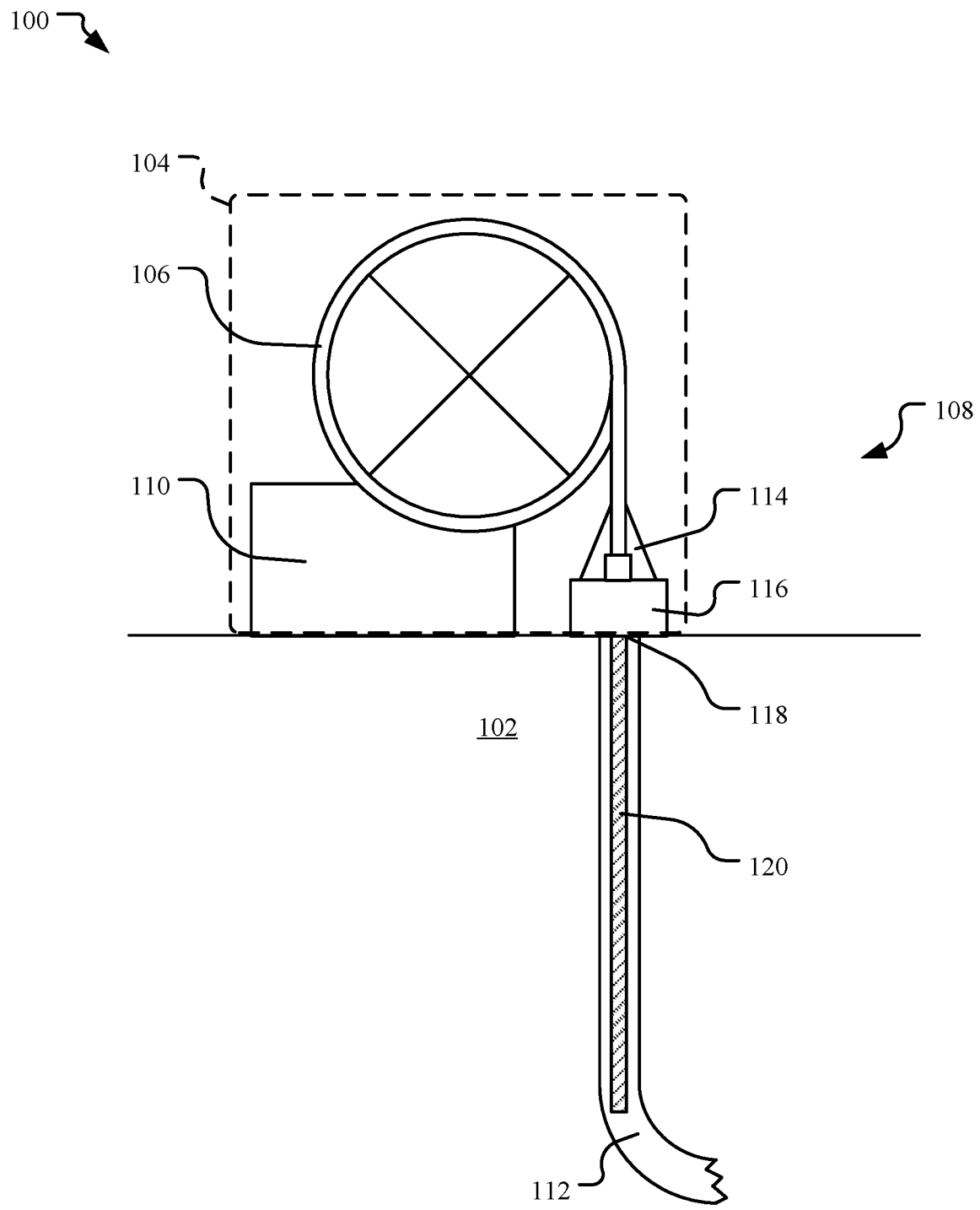
FIG. 1 illustrates an example CT operation environment for implementing a CT pressure testing device as a well control barrier.
Figure 2:
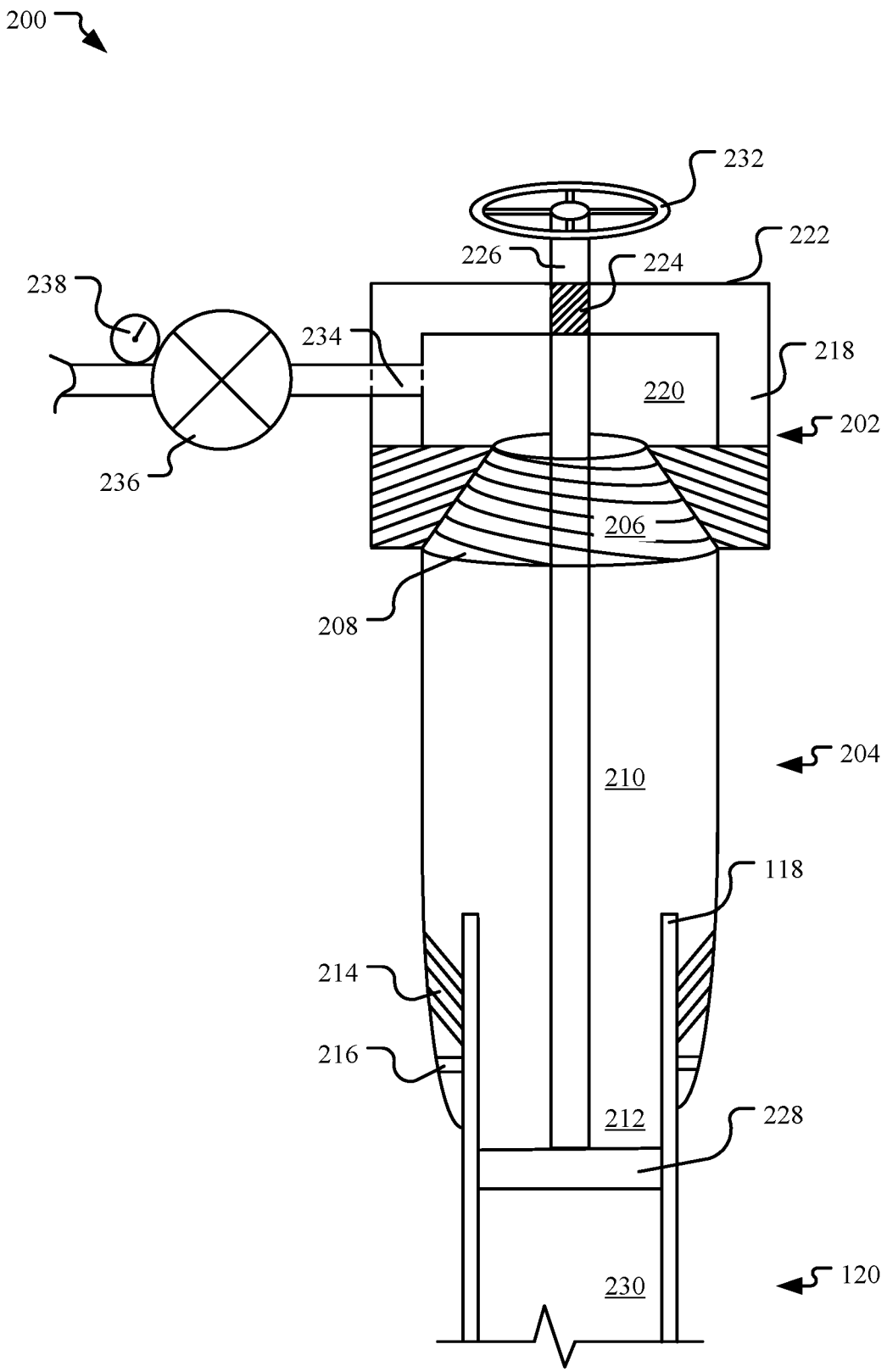
FIG. 2 illustrates an example CT pressure testing device for establishing a well control barrier.

FIG. 1 illustrates an example CT operation environment 100 in which a well control barrier may be created with a CT pressure testing device 200 (illustrated in greater detail in FIG. 2). The CT operation environment 100 may be formed at a subterranean feature 102 and may include a CT unit 104 for transporting a reel of CT 106 to a well site 108 for extracting oil or gas from the subterranean feature 102. The reel of CT 106 may be a continuous length of steel or other composite metal tubing or pipe (e.g., between 1 inch and 3.25 inches in diameter) having a flexibility allowing the CT to be wrapped around a large spool. The reel of CT 106 may be transported to the well site 108, for instant by a CT truck 110 to perform a CT intervention operation in which CT is inserted into a well 112 to provide a controlled pathway for pumping pressurized fluids (e.g., solids-free bio-polymers). CT operations may include matrix and fracture stimulation, wellbore cleanout, real-time downhole measurements, wellbore profiling, perforating, nitrogen kickoff, sand control, chemical washing, drilling, cementing, well circulation, mechanical isolation, and other intervention operations. CT intervention operations may also be used for typical wireline tasks such as lowering a toolstring (e.g., in highly irregular well geometries). CT operations may alter well geometry, provide well diagnostics, and/or assist in production management of the well 112.

In some examples, CT from the reel of CT 106 is unwound and injected into the well 112 at a wellhead with an injector head 114 in communication with a control console and/or power supply. The wellhead may include a first well control barrier 116, such as a BOP. The first well control barrier 116 may include a cutting mechanism, such as a preventer. Once a desired length of CT is inserted into the well 112, the cutting mechanism may cut the CT to create a severed end 118 of a CT segment 120 disposed in the well 112. The first well control barrier 116 may, in some instances, create a pressurized seal over the severed end 118 of the CT segment.

FIG. 2 illustrates an example CT pressure testing device 200 which may be deployed at the CT operation environment 100, for instance, to create a second well control barrier at the severed end 118 of the CT segment 120. The CT pressure testing device 200 may include a pressure test housing 202 that couples to a CT connector 204 at a first distal end 206 (e.g., a top end) of the CT connector 204, for instance, with a high pressure threading 208. The CT connector 204 may include an elongated body 210 with a second distal end 212 (e.g., a bottom end opposite the top end of the CT connector 204) inserted into and/or coupling onto the severed end 118 of the CT segment 120, for instance, with a slip fitting 214 and/or a CT connector seal 216.

In some examples, the pressure test housing 202 may include one or more exterior walls 218 that define a pressure chamber 220 inside the pressure test housing 202 (e.g., at, above, and/or adjacent to the first distal end 206 of the CT connector 204). The pressure chamber 220 may be filled with a high-pressure fluid (e.g., a polymer-based fluid). A top portion 222 of the pressure test housing 202 may have a top opening 224 (e.g., including a seal for creating a sealed top opening) for receiving a rod 226. The rod 226 may comprise a high strength metal rod (e.g., steel) extending from an exterior of the pressure test housing 202 through the top opening 224 of the pressure test housing 202, through the pressure chamber 220, and through the CT connector 204 (e.g., via a channel extending through a central axis of the CT connector 204). The rod 226 may be between about 12" and about 24" in length. The rod 226 may couple to a sealing plug 228 at the second distal end 212 of the CT connector 204. The sealing plug 228 may abut the second distal end 212 of the CT connector 204 to form a sealing interface between the CT connector 204 and an interior 230 of the CT segment 120.

In some examples, a top end of the rod 226 may be coupled to a force activator 232 (e.g., externally to the pressure chamber 220). The force activator 232 may be a mechanism for providing a mechanical force to the rod and/or a hydraulic force to the rod, causing the rod to push the sealing plug 228 into the interior 230 of the CT segment 120 and/or against a CT pressure of the interior 230 of the CT segment 120, sealing the CT segment. For instance, the force activator 232 may comprise a hand wheel for rotating the rod 226 along threading of the rod 226 (e.g., at the top opening 224), causing the rod 226 and sealing plug 228 to move downward or push towards the severed end 118 of the CT segment with a screw-type action. Additionally, or alternatively, the force activator 232 may comprise a hydraulic pump in hydraulic communication with the top end of the rod and may use hydraulic force to push the rod 226 and the sealing plug 228 towards the severed end 118 of the CT segment 120. Because the rod 226 may be coupled to the sealing plug 228 at a bottom end of the rod 226, actuation of the force activator 232 may cause the sealing plug to push into the CT segment 120 and/or may tighten a sealing interface between the interior 230 of the CT segment 120 and the second distal end 212 of the CT connector 204. Likewise, the force activator 232 may receive a reversing actuation to cause the rod 226 to move upward and away from the severed end 118 of the CT segment 120 to loosen the sealing plug 228 (e.g., after completion of a pressure test and/or during removal of the CT connector 204).

In some examples, the pressure test housing 202 may include a fluid inlet 234 connecting the pressure chamber 220 to a pump 236 (e.g., a high pressure/low volume pump). The fluid inlet may operate as a pressure isolation valve for the pressure test housing 202. Upon tightening the sealing plug 228 with the rod 226 and the force activator 232, the pump 236 may increase a pressure in the pressure chamber 220 to perform a pressure test. A pressure gauge or pressure sensor 238 of the pump 236 may indicate a pressure within the pressure chamber 220 during the pressure test. The pressure chamber 220 may be in hydraulic communication with the sealing plug 228 (e.g., via the channel extending through the elongated body 210 of the CT connector 204), such that the pressure within the pressure chamber 220 corresponds to a pressure at the sealing plug 228. As such, the sealing plug 228 may be pressure tested with the pressure test housing 202 connected to the pump 236. After pressure testing the sealing plug, the pressure in the pressure chamber 220 may be released (e.g., via the pump 236) and the force activator 232 may be reversed to loosen the sealing plug 228. Accordingly, the CT pressure testing device 200 may include components for sealing and pressure testing the severed end 118 of the CT segment 120, thus providing an additional well control barrier for the well 112.

Figure 3:
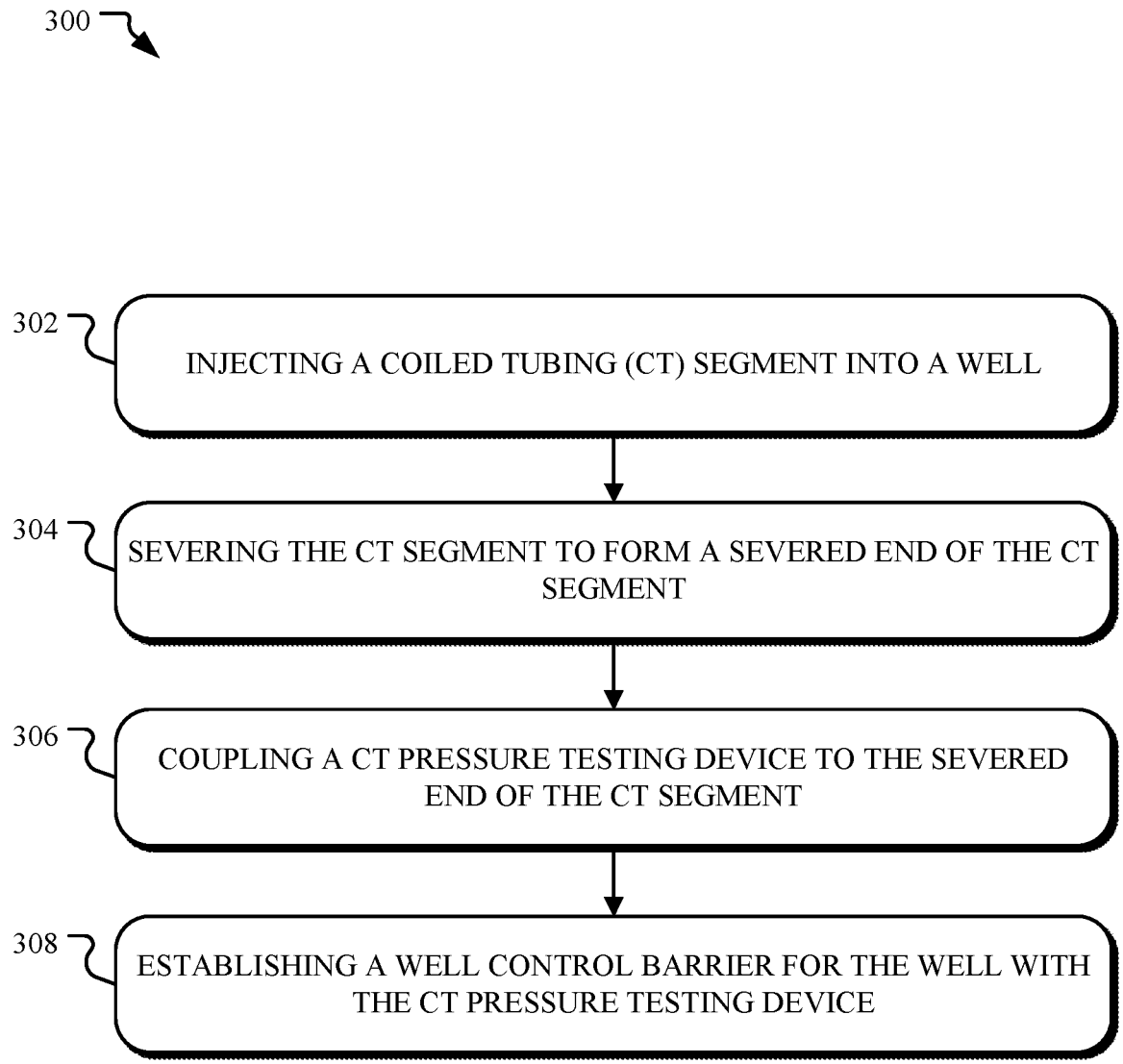
FIG. 3 illustrates example operations for implementing a CT pressure testing device as a well control barrier.

FIG. 3 illustrates an example method 300 for implementing the CT pressure testing device 200 as a well control barrier, which may be performed by any of the systems discussed herein. At step 302, the method 300 may include injecting (e.g., with the CT unit 104) the CT segment 120 into the well 112, such as an oil or gas well. An initial control barrier can be established at a CT end at surface. At step 304, the method 300 may include severing the CT segment 120 to form the severed end 118 of the CT segment 120. Step 304 can further include defeating the initial control barrier by cutting the CT end at surface. At step 306, the method 300 may include coupling the CT pressure testing device 200 (e.g., including the CT connector 204, the pressure test housing 202, the rod 226, the sealing plug 228, and/or the force activator 232) to the severed end 118 of the CT segment 120. At step 308, the method 300 may include establishing a well control barrier for the well 112 with the CT pressure testing device 200 (e.g., by sealing the CT segment 120 with the force activator 232 and/or performing a pressure test on the sealing plug 228 with the pump 236 and the pressure chamber 220).

Figure 4:
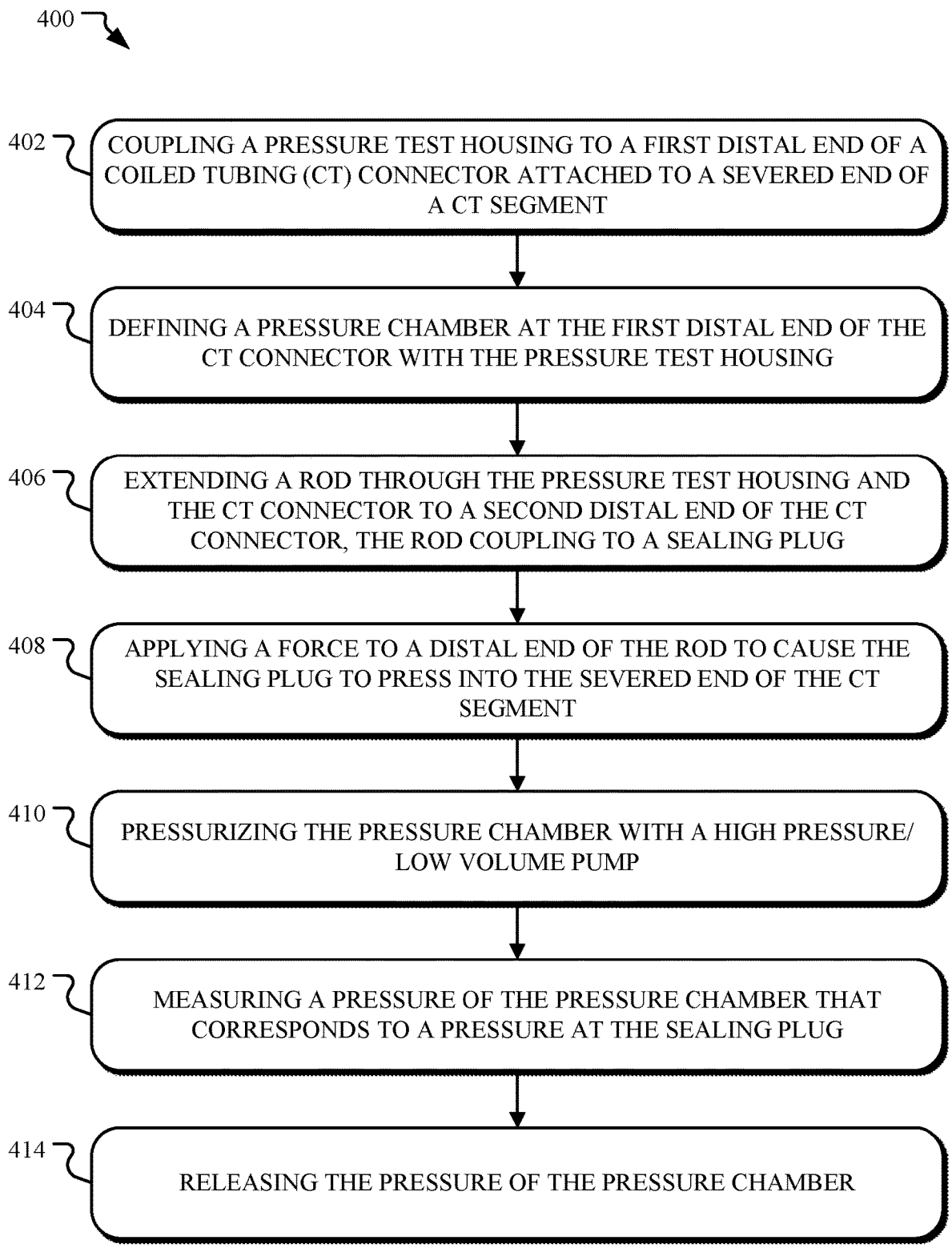
FIG. 4 illustrates example operations for implementing a CT pressure testing device as a well control barrier.

FIG. 4 illustrates an example method 400 for implementing the CT pressure testing device 200 as a well control barrier, which may be performed by any of the systems discussed herein. At step 402, the method 400 may include coupling the pressure test housing 202 to the first distal end 206 of the CT connector 204 attached to the severed end 118 of the CT segment 120. At step 404, the method 400 may include defining the pressure chamber 220 at the first distal end 206 of the CT connector 204 with the pressure test housing 202. At step 406, the method 400 may include extending the rod 226 through the pressure test housing 202 and the CT connector 204 to the second distal end 212 of the CT connector 204, the rod 226 coupling to the sealing plug 228. At step 408, the method 400 may include applying a force to a distal end (e.g., the top end) of the rod 226 to cause the sealing plug 228 to press into the severed end 118 of the CT segment 120 (e.g., forming a sealing interface between the CT connector 204 and the CT segment 120). At step 410, the method 400 may include pressurizing (e.g., increasing a pressure of a fluid contained by) the pressure chamber 220 with a high pressure/low volume pump (e.g., the pump 236 coupled to the fluid inlet 234). At step 412, the method 400 may include measuring a pressure of the pressure chamber 220 that corresponds to a pressure at the sealing plug 228 (e.g., with the pressure gauge or pressure sensor 238). At step 414, the method 400 may include releasing the pressure of the pressure chamber 220 (e.g., via a reverse actuation of the force activator 232).

It is understood that the specific order or hierarchy of steps in the methods depicted in FIGS. 3 and 4 are instances of example approaches and may be rearranged while remaining within the disclosed subject matter. For instance, any of the steps depicted in FIG. 3 or 4 may be omitted, repeated, performed in parallel, performed in a different order, and/or combined with any other of the steps depicted in FIG. 3 or 4.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A system for pressure testing coiled tubing (CT), the system comprising:
 a CT connector including:
  a first distal end;
  a second distal end opposite the first distal end for coupling to an outside surface of a severed end of a CT segment; and a channel extending from the first distal end to the second distal end;
a pressure test housing for coupling to the second distal end of the CT connector, the pressure test housing including:
a pressure chamber at the first distal end of the CT connector;
a pressure isolation valve; and
an opening at a top portion of the pressure test housing;
a sealing plug positioned adjacent to the second distal end and inside the severed end of the CT segment;
a rod coupled to the sealing plug and extending through the channel and the opening; and
a force activator coupled to the rod outside the pressure chamber for causing the rod to push the sealing plug into the severed end of the CT segment.

2. The system of claim 1, further comprising:
a high volume/low pressure pump coupled to the pressure isolation valve for increasing a pressure of the pressure chamber.

3. The system of claim 1, further comprising:
a pressure sensor or pressure gauge for detecting a pressure of the pressure chamber.

4. The system of claim 1, further comprising:
a high-pressure thread coupling the pressure test housing to the first distal end of the CT connector.

5. The system of claim 1, further comprising:
a slip fitting coupling the second distal end to the severed end of the CT segment.

6. The system of claim 1, wherein the force activator comprises a hand wheel for causing the rod to rotate, push toward the severed end of the CT segment, and tighten the sealing plug in the severed end of the CT segment.

7. The system of claim 1, wherein the force activator comprises a hydraulic pump for generating a hydraulic force on the rod and causing the rod to tighten the sealing plug in the severed end of the CT segment.

8. The system of claim 1, wherein the rod is a high strength metal rod.

9. The system of claim 1, wherein the rod has a length between 12" and 24".

10. A device for pressure testing coiled tubing (CT), the device comprising:
a pressure test housing for coupling to a first distal end of a CT connector, the pressure test housing including:
a pressure chamber at the first distal end of the CT connector;
a fluid inlet; and
an opening at a top portion of the pressure test housing;
a rod extending through the opening and through the CT connector to abut a sealing plug disposed inside a severed end of a CT segment, the CT connector including a second distal end configured to couple to an outside surface of the severed end; and
a force activator coupled to the rod outside the pressure chamber for causing the rod to tighten the sealing plug.

11. The device of claim 10, wherein the rod is a high strength metal rod.

12. The device of claim 10, wherein the rod has a length between 12" and 24".

13. The device of claim 10, further comprising:
a seal, at the opening, abutting the rod for maintaining a pressure of the pressure chamber.

14. The device of claim 10, wherein the sealing plug is disposed adjacent to the second distal end.

15. The device of claim 10, wherein the force activator generates a hydraulic force or a rotational force to push the rod and the sealing plug into the severed end.

16. The device of claim 10, wherein the fluid inlet includes a pressure isolation valve coupled to a high volume/low pressure pump.

17. The device of claim 16, wherein the high volume/low pressure pump includes a pressure gauge or pressure sensor for detecting a pressure of the pressure chamber.

18. A method for pressure testing coiled tubing (CT), the method comprising:
coupling a pressure test housing to a distal end of a CT connector;
defining a pressure chamber at the distal end of the CT connector;
extending a rod through the pressure test housing and the CT connector to a second distal end of the CT connector, the rod coupled to a sealing plug, the second distal end configured to couple to an outside surface of a severed end of a CT segment;
applying a force to a distal end of the rod to cause the sealing plug to press into the severed end of the CT segment;
pressurizing the pressure chamber;
measuring a pressure of the pressure chamber that corresponds to a pressure at the sealing plug; and
releasing the pressure of the pressure chamber.

19. The method of claim 18, wherein the pressure chamber is pressurized with a high pressure/low volume pump.

20. A method for pressure testing coiled tubing (CT), the method comprising:
injecting a CT segment into a well;
severing the CT segment to form a severed end of the CT segment;
coupling a CT pressure testing device to the severed end of the CT segment by coupling a distal end of a CT connector to an outside surface of the severed end; and
establishing a well control barrier for the well with the CT pressure testing device by positioning a sealing plug adjacent to the distal end and inside the severed end.

* * * * *